(12) United States Patent
    Wilson (10) Patent No.: US 11,316,446 B2
(45) Date of Patent: Apr. 26, 2022

(54) ELECTROSTATIC ENERGY HARVESTER

(71) Applicant: HONEYWELL FEDERAL MANUFACTURING & TECHNOLOGIES, LLC, Kansas City, MO (US)

(72) Inventor: Amy Charlene Wilson, Belton, MO (US)

(73) Assignee: HONEYWELL FEDERAL MANUFACTURINGS TECHNOLOGIES, LLC, Kansas City, MO (US)

( * ) Notice: Subject to any disclaimer, the term of this patent is extended or adjusted under 35 U.S.C. 154(b) by 123 days.

(21) Appl. No.: 16/889,890

(22) Filed: Jun. 2, 2020

(65) Prior Publication Data
    US 2021/0376770 A1    Dec. 2, 2021

(51) Int. Cl.
    H02N 1/08    (2006.01)
(52) U.S. Cl.
    CPC ..................... *H02N 1/08* (2013.01)
(58) Field of Classification Search
    CPC .......... H02N 1/00; H02N 1/002; H02N 1/008; H02N 1/08
    USPC .................................. 318/116; 310/308–309
    See application file for complete search history.

(56) References Cited

U.S. PATENT DOCUMENTS

| | | | | |
|---|---|---|---|---|
| 7,965,016 B2* | 6/2011 | Despesse | ................. | H02N 1/08 |
| | | | | 310/319 |
| 10,075,006 B2* | 9/2018 | Lefeuvre | .............. | A61N 1/3787 |
| 10,804,038 B2* | 10/2020 | O'Brien | ................. | H02N 2/181 |
| 11,218,087 B2* | 1/2022 | Van Kessel | ........ | G01R 19/0046 |
| 2005/0093302 A1* | 5/2005 | Miyazaki | ................. | H02N 1/08 |
| | | | | 290/1 R |
| 2007/0257490 A1* | 11/2007 | Kornbluh | ............ | F03B 13/1845 |
| | | | | 290/53 |
| 2008/0218132 A1* | 9/2008 | Pelrine | ................. | H02N 11/002 |
| | | | | 322/2 A |
| 2018/0164241 A1* | 6/2018 | Haronian | ................. | H02N 1/08 |

OTHER PUBLICATIONS

S. Meninger, T. O. Mur-Miranda, R. Amirtharajah, A. Chandrakasan and J. Lang, "Vibration-to-electric energy conversion," Proceedings. 1999 International Symposium on Low Power Electronics and Design (Cat. No.99TH8477), 1999, pp. 48-53, doi: 10.1145/313817.313840. (Year: 1999).*

(Continued)

*Primary Examiner* — Burton S Mullins
(74) *Attorney, Agent, or Firm* — Hovey Williams LLP (57) ABSTRACT

An electrostatic energy harvester broadly comprises an electrical energy storage component, an electrical energy transfer stage, first and second variable capacitors, and a switching control module. The electrical energy transfer stage includes diode-connected transistors and dictates electrical energy transfer between the electrical energy storage component and the variable capacitors. The switching control module timely switches between the first and second variable capacitors according to a state machine. Subsequent electrical energy investments from the electrical energy storage component are less than an initial electrical energy investment due to remnant electrical energy remaining at the previously active one of the first and second variable capacitors from previous electrical energy harvesting.

20 Claims, 4 Drawing Sheets

(56) References Cited

OTHER PUBLICATIONS

E. O. Torres and G. A. Rincon-Mora, "Electrostatic Energy Harvester and Li-Ion Charger Circuit for Micro-Scale Applications," 2006 49th IEEE International Midwest Symposium on Circuits and Systems, 2006, pp. 65-69, doi: 10.1109/MWSCAS.2006.381996 (Year: 2006).*

* cited by examiner

ELECTROSTATIC ENERGY HARVESTER

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

Electrostatic energy harvesters are used to convert mechanical vibrational energy into electrical energy for powering low-energy electronic components such as remote or isolated sensors, implanted medical devices, and wearable electronics. Conventional electrostatic energy harvesters produce nanojoules of energy per vibration cycle, while most electrostatic energy harvesting applications require millijoules of energy per vibration cycle. As such, several electrostatic energy harvesters are needed to power even a single low-energy electronic component.

Electrostatic energy harvesters have either synchronous electrical energy transfer stages or asynchronous electrical energy transfer stages, both of which have drawbacks. Synchronous electrical energy transfer stages have high current leakage and require complex control circuitry. Asynchronous electrical energy transfer stages require two batteries and have a limited energy harvesting window in which to harvest electrical energy over the course of a vibration cycle.

Furthermore, dual variable capacitors have been proposed to double the energy harvested per vibration cycle. However using dual variable capacitors as previously proposed in literature would require duplicating and adding to already complicated switching control modules such as timing circuits, which result in additional significant energy losses.

SUMMARY

Embodiments of the invention solve the above-mentioned problems and other problems and provide a distinct advancement in the art of electrostatic energy harvesters. More particularly, the invention provides more efficient electrical energy harvesting and less complex electrical energy transfer stages and variable capacitor switching control.

An embodiment of the invention is an electrostatic energy harvester broadly comprising an electrical energy storage component, an electrical energy transfer stage, first and second variable capacitors, and control modules. The electrostatic energy harvester retains remnant electrical energy from each energy harvesting phase on an active one of the first and second variable capacitors to reduce subsequent electrical energy investments.

The electrical energy storage component is connected to the electrical energy transfer stage and is a battery, a large charged capacitor, a super capacitor, or the like. The electrical energy storage component provides an initial electrical energy investment and subsequent electrical energy investments to the first and second variable capacitors.

The electrical energy transfer stage is connected between the electrical energy storage component and the first and second variable capacitors. The electrical energy transfer stage includes switches or other conventional electrical or electronic components and dictates electrical energy transfer between the electrical energy storage component and the first and second variable capacitors.

The first variable capacitor is connected to the electrical energy transfer stage via a high node and to a ground node or ground plane via a first grounding switch. The high node may include an oscillating mass, which may be shared with the second variable capacitor.

The second variable capacitor is connected to the electrical energy transfer stage via the high node and to a ground node or ground plane via a second grounding switch. The first and second variable capacitors may cooperatively form an in-plane microelectromechanical (MEM) dual variable capacitor and may be 180 degrees out of phase of each other. The grounding switches are never concurrently closed and hence the first and second variable capacitors are never concurrently grounded or "active".

In use, the electrostatic energy harvester converts mechanical vibrations to electrical energy via oscillations of the first and second variable capacitors. In one example, the first variable capacitor is initially active. First, an initial electrical energy investment (i.e., a pre-charge) is provided from the electrical energy storage component to the high node (and hence to the first variable capacitor).

External vibrations induce oscillations of the high node oscillating mass, resulting in capacitance of the first variable capacitor alternating between increasing and decreasing. As capacitance of the first variable capacitor decreases, electrical energy may be harvested from the first variable capacitor to the electrical energy storage component. A remnant (unharvested) electrical energy may remain at the high node.

As the oscillation continues, capacitance of the first variable capacitor begins to increase while voltage of the first variable capacitor begins to decrease. The first and second variable capacitors are switched so that the second variable capacitor is active and the first variable capacitor is inactive.

A subsequent electrical energy investment may then be provided from the electrical energy storage component to the high node (and hence to the second variable capacitor). The subsequent electrical energy investment may be less than the initial electrical energy investment due to the remnant electrical energy remaining at the high node from the previous electrical energy harvesting.

The above steps may be repeated, alternating between the second variable capacitor and the first variable capacitor. In this way, electrical energy is invested and harvested twice per vibration period.

The above-described electrostatic energy harvester provides several advantages. For example, the electrostatic energy harvester utilizes remnant energy retained on the active variable capacitor from each energy harvesting phase to reduce subsequent electrical energy investments. The remnant energy does not need to be transferred to the electrical energy storage component, which reduces energy losses and simplifies the electrical energy transfer stage.

Another embodiment of the invention is an electrostatic energy harvester broadly comprising an electrical energy storage component, an electrical energy transfer stage, and first and second variable capacitors. The electrostatic energy harvester is similar to the electrostatic energy harvester described above except the electrical energy transfer stage utilizes diode-connected transistors, which eliminates several shortcomings of conventional synchronous and asynchronous electrical energy transfer stages.

The electrical energy storage component is connected to the electrical energy transfer stage and is a battery, a large charged capacitor, a super capacitor, or the like. The electrical energy storage component provides an initial electrical energy investment and subsequent electrical energy investments to the first and second variable capacitors.

The electrical energy transfer stage is connected between the electrical energy storage component and the first and second variable capacitors and broadly comprises a first diode-connected transistor, an inductor, and a second diode-connected transistor. The electrical energy transfer stage dictates electrical energy transfer between the electrical energy storage component and the first and second variable capacitors.

The first diode-connected transistor is connected to the electrical energy storage component and allows electrical energy to be invested from the electrical energy storage component to an active one of the first and second variable capacitors during an electrical energy investment phase. The first diode-connected transistor may be a depletion mode gallium nitride transistor.

The inductor is connected between the first diode-connected transistor and the first and second variable capacitors. The inductor slows down the flow of charge from the electrical energy storage component to the first and second variable capacitors during the electrical energy investment phase. The inductor may be omitted at the cost of certain energy losses.

The second diode-connected transistor is connected to the first and second variable capacitors and to the electrical energy storage component and allows electrical energy to be harvested from an active one of the first and second variable capacitors to the electrical energy storage component during an electrical energy harvesting phase. The second diode-connected transistor may be a depletion mode gallium nitride transistor.

The first variable capacitor is connected to the electrical energy transfer stage via a high node and to a ground node or ground plane via a first grounding switch. The high node may include an oscillating mass. The first variable capacitor shares the high node with the second variable capacitor.

The second variable capacitor is connected to the electrical energy transfer stage via the high node and to a ground node or ground plane via a second grounding switch. The first and second variable capacitors may be part of an in-plane microelectromechanical (MEM) dual variable capacitor and may be 180 degrees out of phase of each other. The grounding switches are never concurrently closed and hence the first and second variable capacitors are never concurrently grounded or "active".

In use, the electrostatic energy harvester converts mechanical vibrations to electrical energy via oscillations of the first and second variable capacitors. The first variable capacitor is initially active. An initial electrical energy investment (i.e., a pre-charge) is provided from the electrical energy storage component to the high node (and hence to the first variable capacitor).

External vibrations induce oscillations of the high node oscillating mass, resulting in capacitance of the first variable capacitor alternating between increasing and decreasing. As capacitance of the first variable capacitor decreases, electrical energy may be harvested from the first variable capacitor to the electrical energy storage component via the second diode-connected transistor. A remnant (unharvested) electrical energy may remain at the high node.

As the oscillation continues, capacitance of the first variable capacitor begins to increase while voltage of the first variable capacitor begins to decrease. The first and second variable capacitors are switched so that the second variable capacitor is active and the first variable capacitor is inactive.

A subsequent electrical energy investment may then be provided from the electrical energy storage component to the high node (and hence to the second variable capacitor) via the first diode-connected transistor once the voltage at the high node reaches a low voltage. The subsequent electrical energy investment may be less than the initial electrical energy investment due to the remnant electrical energy remaining at the high node from the previous electrical energy harvesting.

The above steps may be repeated, alternating between the second variable capacitor and the first variable capacitor. In this way, electrical energy is invested and harvested twice per vibration period.

The above-described electrostatic energy harvester provides several advantages. For example, the first and second diode-connected transistors eliminates the need for control circuitry between the electrical energy storage component and the dual variable capacitor. The first and second diode-connected transistors also eliminate high current leakage, dual batteries, and energy harvesting limits based on harvesting time lost while variable capacitor voltage increases.

Another embodiment of the invention is an electrostatic energy harvester broadly comprising an electrical energy storage component, an electrical energy transfer stage, first and second variable capacitors, first and second grounding switches, and a switching control module.

The electrical energy storage component is connected to the electrical energy transfer stage and is a battery, a large charged capacitor, a super capacitor, or the like. The electrical energy storage component provides an initial electrical energy investment and subsequent electrical energy investments to the first and second variable capacitors.

The electrical energy transfer stage is connected between the electrical energy storage component and the first and second variable capacitors. The electrical energy transfer stage may include switches or other conventional electrical or electronic components and dictates electrical energy transfer between the electrical energy storage component and the first and second variable capacitors.

The first variable capacitor is connected to the electrical energy transfer stage via a high node and to a ground node or ground plane via a first grounding switch. The high node may include an oscillating mass. The first variable capacitor shares the high node with the second variable capacitor.

The second variable capacitor is connected to the electrical energy transfer stage via the high node and to a ground node or ground plane via a second grounding switch. The first and second variable capacitors may cooperatively form an in-plane microelectromechanical (MEM) dual variable capacitor and may be 180 degrees out of phase of each other. The grounding switches are never concurrently closed and hence the first and second variable capacitors are never concurrently grounded or "active".

The switching control module broadly comprises a buffer, a comparator, a control module resistor, a control module capacitor, a memory element, and an inverter. The switching control module timely switches between the first and second variable capacitors.

The buffer is connected to the high node of the first and second variable capacitors. The buffer shields against high impedance input to the comparator and may be omitted if the comparator itself has sufficiently high input impedance.

The comparator is connected to the buffer or to the high node of the first and variable capacitors if the buffer is omitted. The comparator identifies whether a voltage of the active variable capacitor (of the first and second variable capacitors) is rising or falling.

The control module resistor is connected between input nodes of the comparator. The control module capacitor is connected to one of the input nodes of the comparator. The control module resistor and the control module capacitor cooperatively form a signal delay RC circuit to output a delayed voltage signal to the comparator.

The memory element is connected between the output node of the comparator, and the first grounding switch and the inverter. The memory element may include logic table XOR gates, a latch, a flip-flop, or the like. The memory element eliminates the need for timing circuits for identifying which grounding switch is initially closed and ensuring the correct grounding switch is closed for each phase of operation.

The inverter is connected to the output side of the memory element and between the grounding switches. The inverter ensures the state of grounding switches are opposite each other and thus ensures the first and second variable capacitors are never concurrently grounded or "active". The inverter may be omitted if the memory element provides this functionality. For example, a D flip flop has two outputs, Q and Q bar. Q bar is connected to one switch and Q is connected to the other.

In use, the electrostatic energy harvester converts mechanical vibrations to electrical energy via oscillations of the first and second variable capacitors. The first variable capacitor is initially active. An initial electrical energy investment (i.e., a pre-charge) is provided from the electrical energy storage component to the high node (and hence to the first variable capacitor).

External vibrations induce oscillations of the high node oscillating mass, resulting in capacitance of the first variable capacitor alternating between increasing and decreasing. As capacitance of the first variable capacitor decreases, electrical energy may be harvested from the first variable capacitor to the electrical energy storage component. A remnant (unharvested) electrical energy may remain at the high node.

As the oscillation continues, capacitance of the first variable capacitor begins to increase while voltage of the first variable capacitor begins to decrease. The first and second variable capacitors are switched so that the second variable capacitor is active and the first variable capacitor is inactive. The switching control module recognizes the decrease in voltage of the first variable capacitor and hot switches to the second variable capacitor. That is, the switching control module deactivates the first variable capacitor and activates the second variable capacitor. Voltage at the high node drops dramatically once the first and second variable capacitors are switched.

A subsequent electrical energy investment may then be provided from the electrical energy storage component to the high node (and hence to the second variable capacitor). The subsequent electrical energy investment may be less than the initial electrical energy investment due to the remnant electrical energy remaining at the high node from the previous electrical energy harvesting.

The above steps may be repeated, alternating between the second variable capacitor and the first variable capacitor. In this way, electrical energy is invested and harvested twice per vibration cycle.

The above-described electrostatic energy harvester provides several advantages. For example, hot switching the first and second variable capacitors eliminates energy losses by keeping remnant energy at the dual variable capacitor. The switching control module, which controls hot switching of the first and second variable capacitors, reduces complexity of variable capacitor control circuitry.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
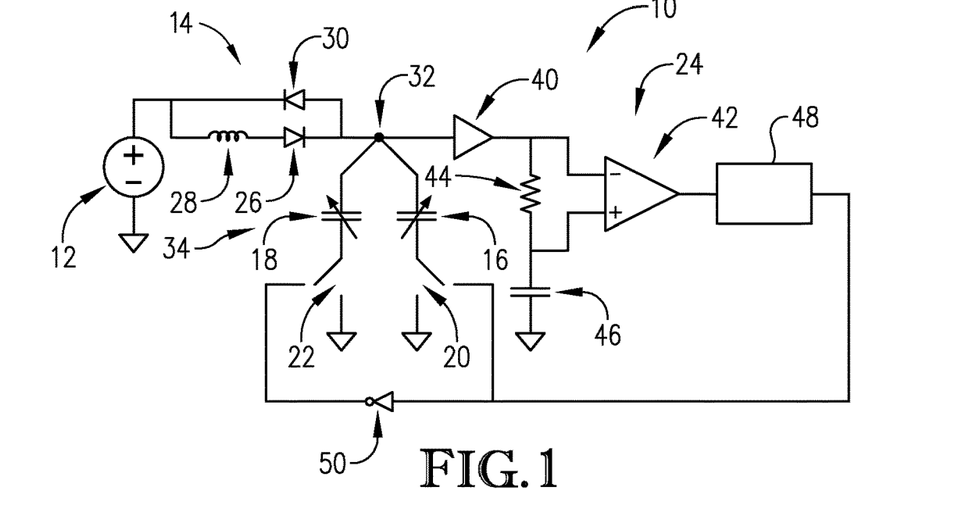
FIG. 1 is a circuit diagram of an electrostatic energy harvester constructed in accordance with an embodiment of the invention.
Figure 2:
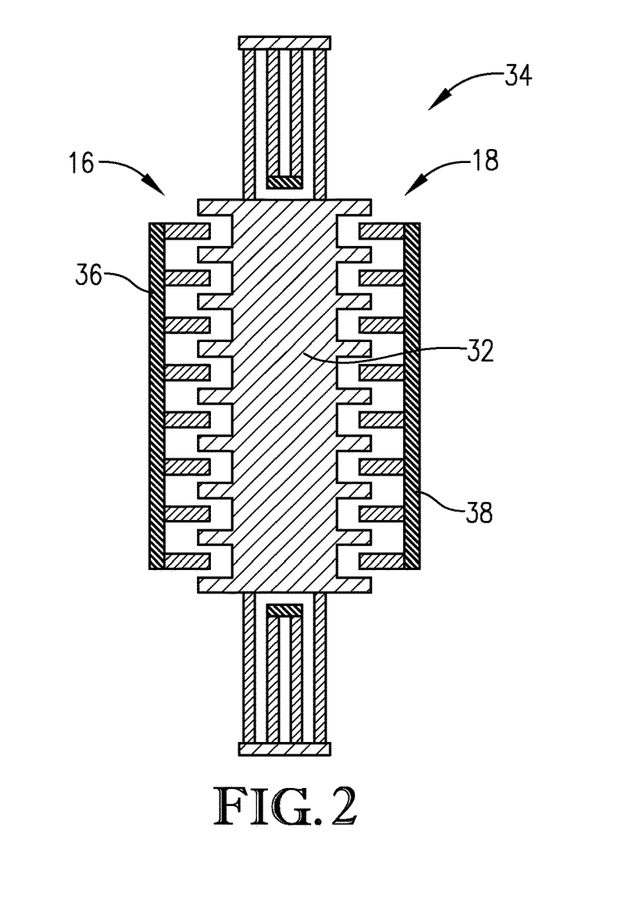
FIG. 2 is an in-plane dual variable capacitor constructed in accordance with an embodiment of the invention.

Turning to FIGS. 1 and 2, an electrostatic energy harvester 10 is illustrated. The electrostatic energy harvester 10 broadly comprises an electrical energy storage component 12, an electrical energy transfer stage 14, a first variable capacitor 16, a second variable capacitor 18, a first grounding switch 20, a second grounding switch 22, and a switching control module 24.

The electrical energy storage component 12 may be connected to the electrical energy transfer stage 14 and may be a battery, a large charged capacitor, a super-capacitor, or any other suitable electrical energy storage device. The electrical energy storage component 12 may be configured provide an initial electrical energy investment and subsequent electrical energy investments to the first and second variable capacitors 16, 18 and to store electrical energy harvested from the first and second variable capacitors 16, 18.

The electrical energy transfer stage 14 may be connected between the electrical energy storage component 12 and the first and second variable capacitors 16, 18 and broadly comprises a first diode-connected transistor 26, an inductor 28, and a second diode-connected transistor 30. The electrical energy transfer stage 14 dictates electrical energy transfer between the electrical energy storage component 12 and the first and second variable capacitors 16, 18.

The first diode-connected transistor 26 may be connected to the electrical energy storage component 12 via its cathode and to the inductor 28 via its anode. The first diode-connected transistor 26 may be a depletion mode gallium nitride transistor.

The inductor 28 may be connected between the anode of the first diode-connected transistor 26 and the first and second variable capacitors 16, 18. The inductor 28 slows down the flow of charge from the electrical energy storage component 12, reducing the current through the first diode-connected transistor 26, thus reducing energy loss in the form of heat. The inductor 28 can be omitted at the cost of (additional) energy losses in the form of heat resulting in a less efficient electrostatic energy harvester.

The second diode-connected transistor 30 may be connected to the electrical energy storage component 12 via its anode and to the first and second variable capacitors 16, 18 via its cathode. The second diode-connected transistor 30 may be a depletion mode gallium nitride transistor.

The first variable capacitor 16 may be connected to the inductor 28 opposite the first diode-connected transistor 26 (or to the anode of the first diode-connected transistor 26 if the inductor 28 is omitted) via a high node 32 and to the first grounding switch 20 via a low node/grounding electrode. The high node 32 may be a shared node that the first variable capacitor 16 shares with the second variable capacitor 18. In one embodiment, the first variable capacitor 16 may be part of an in-plane microelectromechanical (MEM) dual variable capacitor 34 with the high node 32 (i.e., the shared node) being an oscillating/vibrating (i.e., "floating") electrode and the low node being a stationary comb 36.

The second variable capacitor 18 may be connected to the inductor 28 opposite the first diode-connected transistor 26 (or to the anode of the first diode-connected transistor 26 if the inductor 28 is omitted) via a high node and to the second grounding switch 22 via a low node/grounding electrode. The high node of the second variable capacitor 18 may be the shared node (high node 32) described above. In one embodiment, the second variable capacitor 18 may be part of the in-plane MEM dual variable capacitor 34 described above, with the low node of the second variable capacitor 18 being a stationary comb 38.

The first grounding switch 20 may be connected between the low node of the first variable capacitor 16 and a grounding plane or grounding node. The first grounding switch 20 may be a relay or any other suitable electronic switch.

The second grounding switch 22 may be connected between the low node of the second variable capacitor 18 and a grounding plane or grounding node. The second grounding switch 22 may be a relay or any other suitable electronic switch. In one embodiment, the first and second grounding switches 20, 22 are never concurrently closed and hence the first and second variable capacitors 16, 18 are never concurrently grounded or "active".

The switching control module 24 comprises a buffer 40, a comparator 42, a control module resistor 44, a control module capacitor 46, a memory element 48, and an inverter 50. The switching control module 24 timely switches between the first and second variable capacitors 16, 18. More specifically, the switching control module 24 is configured to toggle the first grounding switch 20 and the second grounding switch 22 when a voltage drop at the high node 32 is detected so as to switch between the first variable capacitor 16 and the second variable capacitor 18 regardless of which of the first grounding switch 20 and the second grounding switch 22 is closed, including on initial operation.

The buffer 40 may be connected to the high node 32 and to a first input node of the comparator 42. The buffer 40 shields against high impedance input to the comparator 42. The buffer 40 also reduces an amount of lost charge due to the inclusion of the switching control module 24. The buffer 40 may be omitted if the comparator 42 itself has sufficiently high input impedance.

The comparator 42 includes a first input node, a second input node, and an output node. The first input node may be an inverting input node (e.g., $V_-$) and may be connected to the buffer 40 or to the high node 32 of the first and second variable capacitors 16, 18 if the buffer 40 is omitted. The second input node may be a non-inverting input (e.g., $V_+$) and may be connected to the control module resistor 44 opposite the buffer 40 or high node 32 and to the control module capacitor 46. The output node of the comparator may be connected to the memory element 48.

The control module resistor 44 may be connected between the first and second inputs of the comparator 42. The control module resistor 44 and the control module capacitor 46 cooperatively form a resistor-capacitor circuit (RC circuit) to output a delayed voltage signal to the second input of the comparator 42.

The control module capacitor 46 may be connected to the second input of the comparator 42. The control module capacitor 46 and the control module resistor 44 cooperatively form an RC circuit to output a delayed voltage signal to the second input of the comparator 42.

The memory element 48 is connected between the output node of the comparator 42, and the first grounding switch 20 and the inverter 50. The memory element may include logic table XOR gates, a latch, a flip-flop, or the like and operates according to a state machine 200 described in more detail below. The memory element 48 eliminates the need for timing circuits for identifying which grounding switch is initially closed and ensuring the correct grounding switch is closed for each phase of operation.

The inverter 50 is connected to the memory element 48 and connected between the first grounding switch 20 and the second grounding switch 22. The inverter 50 ensures the state of the second grounding switch 22 is opposite the state of the first grounding switch 20. Importantly, the inverter 50 ensures the first and second variable capacitors 16, 18 are never concurrently grounded or "active".

Figure 3:
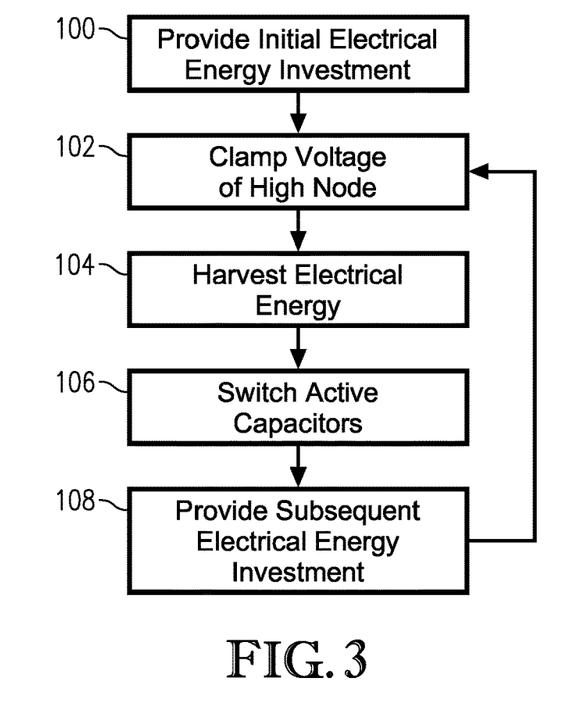
FIG. 3 is a flow diagram showing certain method steps for harvesting electrical energy in accordance with another embodiment of the invention.

Turning to FIG. 3 and with reference to FIGS. 1 and 2, use of the electrostatic energy harvester 10 will now be described. Initially, either the first grounding switch 20 or the second grounding switch 22 is closed and hence either the first variable capacitor 16 or the second variable capacitor 18 is connected (i.e., "active") by default. Identifying via the state machine 200 of the switching control module 24 which grounding switch is initially closed (and hence which variable capacitor is initially active) will be discussed in more detail below. For the sake of discussion, assume the first variable capacitor 16 is initially active.

An initial electrical energy investment (i.e., a pre-charge) will be provided from the electrical energy storage component 12 to the high node 32, and hence to the dual variable capacitor 34, via the first diode-connected transistor, as shown in block 100. The initial electrical energy investment creates an electric field across the first variable capacitor 16 (since it is active).

External vibrations induce oscillations of the high node 32 of the dual variable capacitor 34. Depending on the phase of oscillation, capacitance of the first variable capacitor 16 will initially be increasing or decreasing. Assuming capacitance of the first variable capacitor 16 is initially decreasing (e.g., from $C_{max}$), voltage at the high node 32 is increasing. Identifying whether capacitance is initially increasing or decreasing via the state machine 200 of the switching control module 24 will be described in more detail below. Voltage of the high node 32 then clamps to the voltage of the electrical energy storage component 12 via the first diode-connected transistor 26, as shown in block 102. That is, when the voltage of the high node 32 is one diode drop above the clamping voltage, the voltage of the first variable capacitor 16 may be held constant due to the presence of the second diode-connected transistor. At this point, capacitance may be at $C_{mid}$:

$$C_{mid,r} = \frac{V_{clamp} - V_{D,PCH}}{V_{clamp} + V_{D,H}} * C_{max}.$$

As capacitance of the first variable capacitor 16 decreases (e.g., from $C_{mid}$ to $C_{min}$), electrical energy may be harvested from the first variable capacitor 16 to the electrical energy storage component 12 (as shown in block 104) via the second diode-connected transistor 30:

$$E_{harvest} = (C_{mid,r} - C_{min}) * (V_{clamp} + V_{D,H})^2.$$

A remnant electrical energy may remain at the high node 32.

As the oscillation continues, capacitance of the first variable capacitor 16 begins to increase while voltage of the first variable capacitor 16 begins to decrease. The comparator 42 continuously receives a delayed voltage signal via the control module resistor 44 and the control module capacitor 46 and a current voltage signal. The comparator 42 compares the delayed voltage signal to the current voltage signal and outputs a decreasing voltage signal to the switching control module 24. In this way, the switching control module 24 recognizes the decrease in voltage of the first variable capacitor 16 and hot switches to the second variable capacitor 18, as shown in block 106. In other words, the switching control module 24 deactivates the first variable capacitor 16 and activates the second variable capacitor 18.

Voltage at the high node 32 drops dramatically once the first and second variable capacitors 16, 18 are switched. The dramatic voltage drop yields:

$$V_{low} = \frac{C_{min}}{C_{max}} * V_{clamp} + V_{D,H}.$$

$$C_{mid,r,new} = \frac{V_{low}}{V_{clamp} - V_{D,PCH}} * C_{max}.$$

The voltage at the high node 32 continues to drop until it is one diode drop below the clamping voltage due to the presence of the first diode-connected transistor 26.

A subsequent electrical energy investment may then be provided from the electrical energy storage component 12 to the high node 32 (and hence to the active variable capacitor) via the first diode-connected transistor once the voltage at the high node 32 reaches a low voltage, as shown in block 108. The subsequent electrical energy investment may be less than the initial electrical energy investment due to the remnant electrical energy remaining at the high node 32 from the previous electrical energy harvesting. Specifically, if $V_{low}$ is less than $V_{clamp} - V_{D,PCH}$, then the electrical energy storage component 12 invests:

$$E_{invest} = 0.5 * (C_{max}) * (V_{clamp} - V_{D,PCH} - V_{low})^2.$$

Blocks 102-108 may be repeated, alternating between the second variable capacitor 18 and the first variable capacitor 16. In this way, electrical energy is invested and harvested twice per vibration cycle. Exemplary values include the following: $V_{clamp}=10V$; $V_{D,PCH}=V_{D,H}=3V$; $C_{min}=50$ pF; $C_{max}=250$ pF; and $C_{mid,r}=134.6$ pF. $E_{harvest}=14.3$ nJ. A dramatic voltage drop of $V_{low}=2.5V$. Because energy is invested and harvested twice per vibration cycle, $E_{total}=14.3$ nJ−2.5 nJ+14.3 nJ−2.5 nJ=23.6 nJ.

Figure 4:
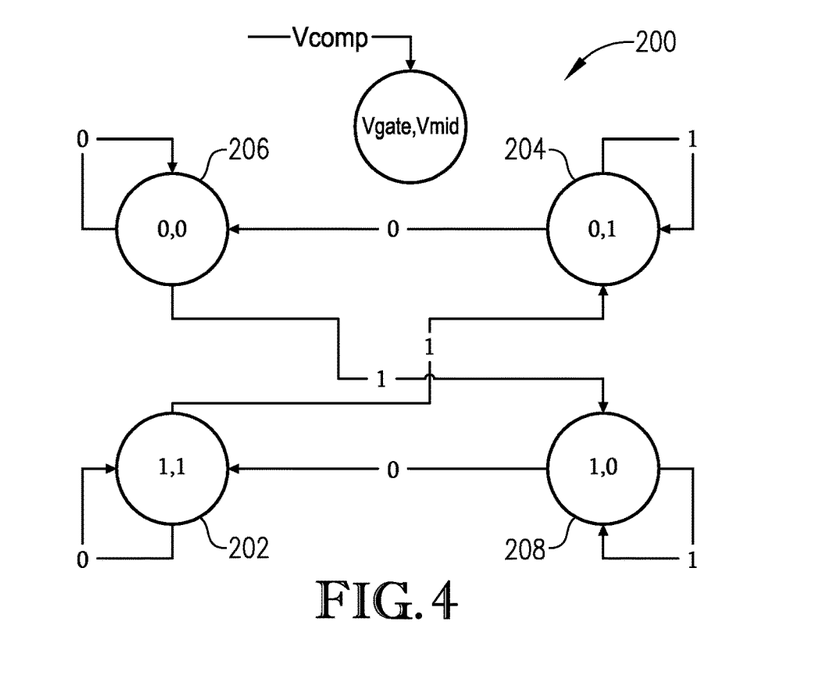
FIG. 4 is a flow diagram of a state machine of a switching control module memory element constructed in accordance with an embodiment of the invention.

Turning to FIG. 4, operation of the switching control module 24 will now be described in more detail. The comparator output is always initially logic low (denoted by $V_{comp}=0$) because the control module capacitor 46 for the signal delay RC circuit initially has no charge. This means the non-delayed input to the comparator 42 is of value equal to or greater than the delayed input. Taking the state of the first grounding switch 20 to be unknown, there are four potential initial conditions: 1) the first grounding switch 20 is closed and the first variable capacitor 16 has decreasing capacitance; 2) the first grounding switch 20 is closed and the second variable capacitor 18 has decreasing capacitance; 3) the first grounding switch 20 is open and the first variable capacitor 16 has decreasing capacitance; and 4) the first grounding switch 20 is open and the second variable capacitor 18 has decreasing capacitance. The first two conditions can be grouped into a first scenario in which the first grounding switch 20 is closed and a second scenario in which the first grounding switch 20 is open.

In scenario 1, the first grounding switch 20 is closed such that a gate voltage or primary XOR logic state of the memory element 48 is logic high (denoted by $V_{gate}=1$). With $V_{comp}=0$ and $V_{gate}=1$, a secondary XOR logic state of the memory element 48 is logic high (denoted by $V_{mid}=1$), as shown in block 202 of the state machine 200. Either the first variable capacitor 16 has decreasing capacitance in which case the voltage at the high node 32 will increase until the capacitance of the first variable capacitor 16 begins to increase or the second variable capacitor 18 has decreasing capacitance in which case the high node voltage will decrease immediately. Either way, when the high node voltage begins to decrease, $V_{comp}$ will change from 0 to 1. With $V_{comp}=1$ and $V_{mid}=1$, $V_{gate}$ will change from 1 to 0, as shown in block 204 of the state machine 200, thereby opening the first grounding switch 20. The inverter 50 in turn closes the second grounding switch 22. The high node voltage then begins to increase, changing $V_{comp}$ from 1 to 0. With $V_{gate}=0$ and $V_{comp}=0$, $V_{mid}$ changes from 1 to 0, as shown in block 206 of the state machine 200. When the second variable capacitor 18 begins to increase in capacitance, voltage at the high node begins to drop such that $V_{comp}$ changes from 0 to 1. With $V_{comp}=1$ and $V_{mid}=0$, $V_{gate}$ changes from 0 to 1, as shown in block 208 of the state machine 200. With $V_{comp}=1$ and $V_{gate}=1$, $V_{mid}$ remains at 0. When the high node voltage begins to increase, $V_{comp}$ changes from 1 to 0. With $V_{comp}=0$ and $V_{gate}=1$, $V_{mid}$ changes from 0 to 1, as shown in block 202 of the state machine. The state machine 200 continues to cycle through blocks 202-208.

Scenario 2 is the same as scenario 1 but with a different starting point. In scenario 2, the first grounding switch 20 is open such that $V_{gate}=0$. With $V_{gate}=0$ and $V_{comp}=0$, $V_{mid}=0$, as shown in block 206 of the state machine 200. Either variable capacitor can have decreasing capacitance which only affects how soon the switching control module 24 changes state. The high node voltage eventually begins to decrease, causing the comparator output $V_{comp}$ to change from 0 to 1. With $V_{comp}=1$ and $V_{mid}=0$, $V_{gate}$ changes from 0 to 1, as shown in block 208 of the state machine 200, thus closing the first grounding switch 20. The inverter 50 in turn opens the second grounding switch 22. With $V_{comp}=1$ and $V_{gate}=1$, $V_{mid}$ remains at 0. The high node voltage then begins to increase as the first variable capacitor 16 decreases in capacitance, thereby changing $V_{comp}$ from 1 to 0. With $V_{comp}=0$ and $V_{gate}=1$, $V_{mid}$ changes from 0 to 1, as shown in block 202 of the state machine 200. The state machine 200 continues to cycle through blocks 202-208.

Figure 5:
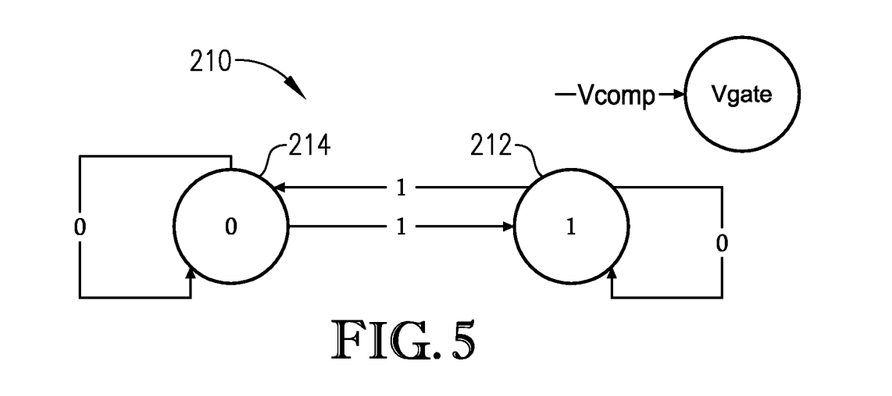
FIG. 5 is a flow diagram of a state machine of a switching control module flip-flop constructed in accordance with an embodiment of the invention.
Figure 6:
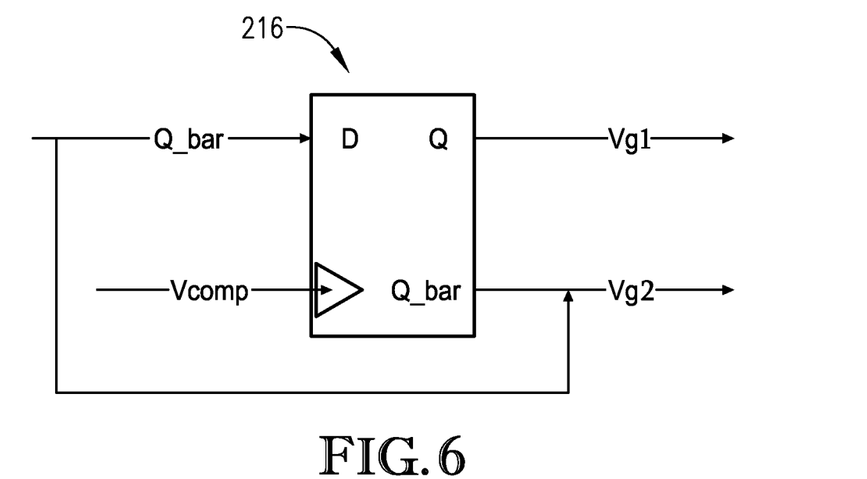
FIG. 6 is a circuit diagram of a flip-flop constructed in accordance with an embodiment of the invention.

A somewhat condensed state machine 210 is expressed in FIG. 5. If the first grounding switch 20 is closed (block 212), the high voltage node eventually begins to decrease in voltage, represented by $V_{comp}=1$. This changes $V_{gate}$ from 1 to 0, as shown in block 214, thereby opening the first grounding switch 20. The inverter 50 in turn opens the second grounding switch 22. The next time the high voltage node begins to decrease in voltage, $V_{gate}$ changes from 0 to 1 as shown in block 212, thereby closing the first grounding switch 20. The inverter 50 in turn opens the second grounding switch 22. This condensed state machine can be implemented by a flip flop, such as the flip flop 216 shown in FIG. 6.

The above-described electrostatic energy harvester 10 provides several advantages. For example, the dual variable capacitor 34 enables electrical energy to be harvested twice per vibration cycle. Hot switching the first and second variable capacitors 16, 18 eliminates energy losses by keeping remnant energy at the dual variable capacitor 34. The first and second diode-connected transistors 26, 30 eliminate the need for control circuitry between the electrical energy storage component 12 and the dual variable capacitor 34. The first and second diode-connected transistors 26, 30 also eliminate high current leakage, dual batteries, and energy harvesting limits based on harvesting time lost while variable capacitor voltage increases. The switching control module 24 (for controlling hot switching of the first and second variable capacitors 16, 18) reduces complexity of variable capacitor control circuitry.

Figure 7:
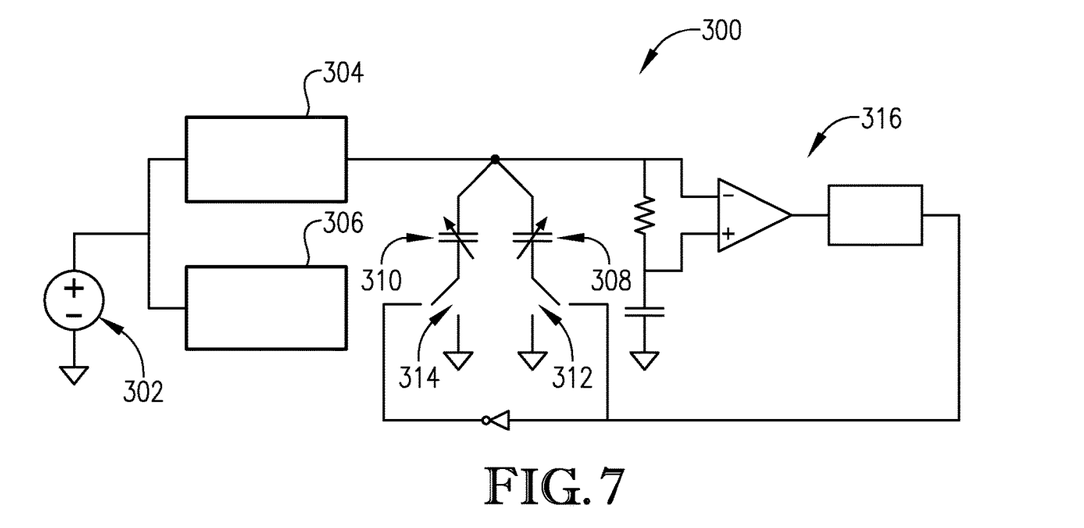
FIG. 7 is a circuit diagram of an electrostatic energy harvester constructed in accordance with another embodiment of the invention.
Figure 8:
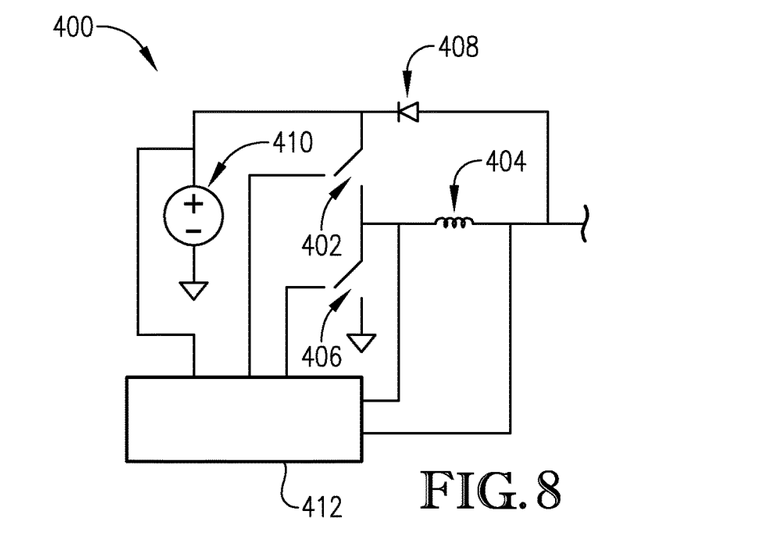
FIG. 8 is a circuit diagram of a portion of an electrostatic energy harvester constructed in accordance with another embodiment of the invention.

Turning to FIG. 7, another embodiment of the invention is an electrostatic energy harvester 300 broadly comprising an electrical energy storage component 302, an electrical energy transfer stage 304, an electrical energy transfer stage control module 306, a first variable capacitor 308, a second variable capacitor 310, a first grounding switch 312, a second grounding switch 314, and a switching control module 316. The electrostatic energy harvester 300 is similar to the electrostatic energy harvester 10 described above except various electrical energy transfer stages (such as electrical energy transfer stage 400 described below) and various electrical energy transfer stage control modules may be used.

The electrical energy storage component 302 is substantially similar to the electrical energy storage component 12 described above. That is, the electrical energy storage component 302 may be connected to the electrical energy transfer stage 304 and may be a battery, a large charged capacitor, a super-capacitor, or any other suitable electrical energy storage device. The electrical energy storage component 302 may be configured provide an initial electrical energy investment and subsequent electrical energy investments to the first and second variable capacitors 308, 310 and to store electrical energy harvested from the first and second variable capacitors 308, 310.

The electrical energy transfer stage 304 may be connected between the electrical energy storage component 302 and the first and second variable capacitors 308, 310. The electrical energy transfer stage 304 dictates electrical energy transfer between the electrical energy storage component 302 and the first and second variable capacitors 308, 310. The electrical energy transfer stage 304 may include switches or other electrical or electronic components (see the exemplary electrical energy transfer stage 400 described below). Unlike the electrical energy transfer stage 14 described above, the electrical energy transfer stage 304 may require the electrical energy transfer stage control module 306.

The electrical energy transfer stage control module 306 may be connected to the electrical energy storage component 302 and/or to the electrical energy transfer stage 304. The electrical energy transfer stage control module 306 includes switches or other electrical or electronic components for controlling the electrical energy transfer stage.

The first variable capacitor 308 may be connected to the electrical energy transfer stage 304 via a high node 318 and to the first grounding switch 312 via a low node. The high node 318 may be a shared node that the first variable capacitor 308 shares with the second variable capacitor 310. In one embodiment, the first variable capacitor 308 may be part of an in-plane microelectromechanical (MEM) dual variable capacitor 320 with the high node 318 (i.e., the shared node) being an oscillating/vibrating (i.e., "floating") electrode and the low node being a stationary comb.

The second variable capacitor 310 may be connected to the electrical energy transfer stage 304 via a high node and to the second grounding switch 314 via a low node. The high node of the second variable capacitor 310 may be the shared node (high node 318) described above. In one embodiment, the second variable capacitor 310 may be part of the in-plane MEM dual variable capacitor 320 described above, with the low node of the second variable capacitor 310 being a stationary comb.

The first grounding switch 312 may be connected between the low node of the first variable capacitor 308 and a grounding plane or grounding node. The first grounding switch 312 may be a relay or any other suitable electronic switch.

The second grounding switch 314 may be connected between the low node of the second variable capacitor 310 and a grounding plane or grounding node. The second grounding switch 314 may be a relay or any other suitable electronic switch. In one embodiment, the first and second grounding switches 312, 314 are never concurrently closed and hence the first and second variable capacitors 308, 310 are never concurrently grounded or "active".

The switching control module 316 timely switches between the first and second variable capacitors 308, 310. The switching control module 316 may be substantially similar to the switching control module 24 described above and thus will not be discussed further.

Turning to FIG. 8, an electrical energy transfer stage 400 constructed in accordance with another embodiment of the invention is shown. The electrical energy transfer stage 400 broadly comprises an energy investment switch 402, an inductor 404, a grounding switch 406, and a diode-connected transistor 408. The electrical energy transfer stage 400 can be used as the electrical energy transfer stage 304 of the electrostatic energy harvester 300 described above.

The energy investment switch 402 may be connected between an electrical energy storage component 410 (described below) and the grounding switch 406. The energy investment switch 402 may be configured to be closed by electrical energy transfer stage control module 412 (described below) during an electrical energy investment phase so that electrical energy may transferred from the electrical energy storage component 410 to a variable capacitor (or to multiple variable capacitors). The energy investment switch 402 may be configured to be opened by the electrical energy transfer stage control module 412 during an electrical energy harvesting phase.

The inductor 404 may be connected between the energy investment switch 402 and a high node of the variable capacitor(s). The inductor 404 slows down the flow of charge from the electrical energy storage component 410 to the variable capacitor(s), thus reducing energy loss in the form of heat. The inductor 404 can be omitted at the cost of (additional) energy losses in the form of heat resulting in a less efficient electrostatic energy harvester.

The grounding switch 406 may be connected between the energy investment switch 402 and the inductor 404, and ground node or ground plane. The grounding switch 406 may be configured to be opened by the electrical energy transfer stage control module 412 during the energy investment phase and closed by the electrical energy transfer stage control module 412 during the energy harvesting phase.

The diode-connected transistor 408 may be connected to the electrical energy storage component 410 via its anode and to the variable capacitor(s) via its cathode. The second diode-connected transistor 30 may be a depletion mode gallium nitride transistor.

The electrical energy storage component 410 may be connected via its high node to the electrical energy transfer stage 400 and to the electrical energy transfer stage control module 412. The electrical energy storage component 410 may be a battery, a large charged capacitor, a super-capacitor, or any other suitable electrical energy storage device. The electrical energy storage component 410 may be configured provide an initial electrical energy investment and subsequent electrical energy investments to the variable capacitor(s) and to store electrical energy harvested from the variable capacitor(s).

The electrical energy transfer stage control module 412 may be connected to the electrical energy storage component 410 and to the electrical energy transfer stage 400. Specifically, outputs of the electrical energy transfer stage control circuit 412 may be connected to the energy investment switch 402 and the grounding switch 406, while inputs of the electrical energy transfer stage control circuit 412 may be connected to the electrical energy storage component 410, between the energy investment switch 402 and the inductor 404, and between the inductor 404 and the variable capacitor(s). The electrical energy transfer stage control module 306 includes electrical or electronic components for controlling the electrical energy transfer stage and more specifically, for cycling between electrical energy investment from the electrical energy storage component 410 to the variable capacitor(s) during the electrical energy investment phase and electrical energy harvesting from the variable capacitor(s) to the electrical energy storage component 410 during the electrical energy harvesting phase.

Use of the electrical energy transfer stage 400 may be substantially similar to use of the electrical energy transfer stage 14 described above, except an electrical energy transfer stage control module 412 is used to control electrical energy transfer between the electrical energy storage component 410 and the variable capacitor(s). Specifically, the electrical energy transfer stage control module 412 closes the energy investment switch 402 and opens the grounding switch 406 during the electrical energy investment phase so that electrical energy may transferred from the electrical energy storage component 410 to the variable capacitor(s). The electrical energy transfer stage control switch 406 opens the energy investment switch 402 and closes the grounding switch 406 during the electrical energy harvesting phase so that electrical energy may be transferred from the variable capacitor(s) to the electrical energy storage component 410.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An electrostatic energy harvester comprising:
a first variable capacitor having a high node;
a first grounding switch, the first variable capacitor being grounded via the first grounding switch when the first grounding switch is closed;
a second variable capacitor sharing the high node with the first variable capacitor and being out of phase with the first variable capacitor;
a second grounding switch, the second variable capacitor being grounded via the second grounding switch when the second grounding switch is closed; and
a switching control module comprising:
a comparator having a first input node, a second input node, and an output node, the comparator being configured to identify a voltage drop at the shared node; and
a memory element connected to the output node of the comparator, the memory element being configured to change between at least two states such that the switching control module is configured to toggle the first grounding switch and the second grounding switch when the voltage drop is detected so as to switch between the first variable capacitor and the second variable capacitor regardless of which of the first grounding switch and the second grounding switch is initially closed.

2. The electrostatic energy harvester of claim 1, further comprising a buffer connected between the shared node and the comparator for preventing excess charge leakage to the comparator.

3. The electrostatic energy harvester of claim 1, wherein the comparator has sufficient impedance for preventing excess charge leakage to the comparator.

4. The electrostatic energy harvester of claim 1, wherein the memory element includes two XOR gates.

5. The electrostatic energy harvester of claim 1, wherein the memory element includes a latch.

6. The electrostatic energy harvester of claim 1, wherein the memory element includes a flip-flop.

7. The electrostatic energy harvester of claim 1, further comprising:
 a control module resistor connected between the first input node and the second input node; and
 a control module capacitor connected to one of the first input node and the second input node, the control module resistor and the control module capacitor being configured to delay a voltage signal from the shared node to the comparator.

8. The electrostatic energy harvester of claim 1, further comprising an inverter connected between the memory element and one of the first grounding switch and the second grounding switch to ensure the first capacitor and the second capacitor are not grounded concurrently.

9. The electrostatic energy harvester of claim 1, wherein the first variable capacitor and the second variable capacitor are 180 degrees out of phase with each other.

10. The electrostatic energy harvester of claim 1, wherein the first variable capacitor and the second variable capacitor cooperatively form a microelectromechanical in-plane variable capacitor.

11. A method of controlling an electrostatic energy harvester, the method comprising the steps of:
 detecting a voltage decrease from a high node shared by a first variable capacitor and a second variable capacitor of the electrostatic energy harvester via a comparator;
 switching between the first variable capacitor and the second variable capacitor via a switching control module having a memory element and an inverter when the voltage decrease is detected regardless of which of the first variable capacitor and the second variable capacitor is initially active.

12. The method of claim 11, wherein the step of detecting the voltage decrease includes comparing a voltage level of the shared node to a delayed voltage level of the shared node.

13. The method of claim 12, further comprising the step of delaying a voltage signal to the comparator via a control module resistor connected between a first input node and a second input node of the comparator and a control module capacitor connected to one of the first input node and the second input node of the comparator.

14. The method of claim 11, wherein the step of switching between the first variable capacitor and the second variable capacitor includes switching a state of a first logic gate linked to a first grounding switch grounding the first variable capacitor according to an output of the comparator.

15. The method of claim 14, further comprising the step of preventing subsequent variable capacitor switching as the voltage continues to drop.

16. The method of claim 14, wherein the step of switching between the first variable capacitor and the second variable capacitor includes inverting a signal to the second variable capacitor.

17. The method of claim 11, further comprising the step of harvesting charge from at least one of the first variable capacitor and the second variable capacitor to a storage device when a voltage of the at least one of the first variable capacitor and the second variable capacitor clamps to a voltage of the storage device.

18. The method of claim 11, further comprising the step of buffering a voltage of the shared node to reduce charge loss due to detecting step.

19. The method of claim 18, wherein the step of buffering is performed via high input impedance of the comparator.

20. An electrostatic energy harvester comprising:
 a first variable capacitor having a high node;
 a first grounding switch, the first variable capacitor being grounded via the first grounding switch when the first grounding switch is closed;
 a second variable capacitor sharing the high node with the first variable capacitor and being out of phase with the first variable capacitor;
 a second grounding switch, the second variable capacitor being grounded via the second grounding switch when the second grounding switch is closed; and
 a switching control module comprising:
  a comparator having a first input node, a second input node, and an output node, the comparator being configured to identify a voltage drop at the shared node;
  a high input impedance buffer connected between the high node and one of the first input node and the second input node;
  a memory element connected to the output node of the comparator and configured to store an output of the comparator, the memory element being configured to change between at least two states;
  a control module resistor connected between the first input node and the second input node;
  a control module capacitor connected to one of the first input node and the second input node, the control module resistor and the control module capacitor being configured to delay a voltage signal from the shared node to the comparator; and
  an inverter connected between the memory element and one of the first grounding switch and the second grounding switch,
  the switching control module being configured to toggle the first grounding switch and the second grounding switch when the voltage drop is detected so as to switch between the first variable capacitor and the second variable capacitor regardless of which of the first grounding switch and the second grounding switch is initially closed.

* * * * *